T. TRIPP.
Circular-Saw.

No. 217,305.  Patented July 8, 1879.

Witnesses.  Inventor.
Thomas Tripp.

UNITED STATES PATENT OFFICE.

THOMAS TRIPP, OF EAST STOUGHTON, MASSACHUSETTS.

IMPROVEMENT IN CIRCULAR SAWS.

Specification forming part of Letters Patent No. 217,305, dated July 8, 1879; application filed April 28, 1879.

*To all whom it may concern:*

Be it known that I, THOMAS TRIPP, of East Stoughton, county of Norfolk, and State of Massachusetts, have invented certain useful Improvements in Circular Saws, of which the following is a specification.

In this saw two classes of teeth are employed, one which I call the "saw-teeth," and which serve to cut the saw-kerf with a smooth finish, and are of peculiar shape, and the other, which I term the "finishing-teeth," to remove any imperfection left by the first and reduce the surface of the wood to a smooth, even condition; and the invention consists in the peculiar shape of the saw-teeth, as hereinafter explained; and, secondly, in arranging the plane teeth in pairs alternately between one or more alternate saw-teeth.

Figure 1:
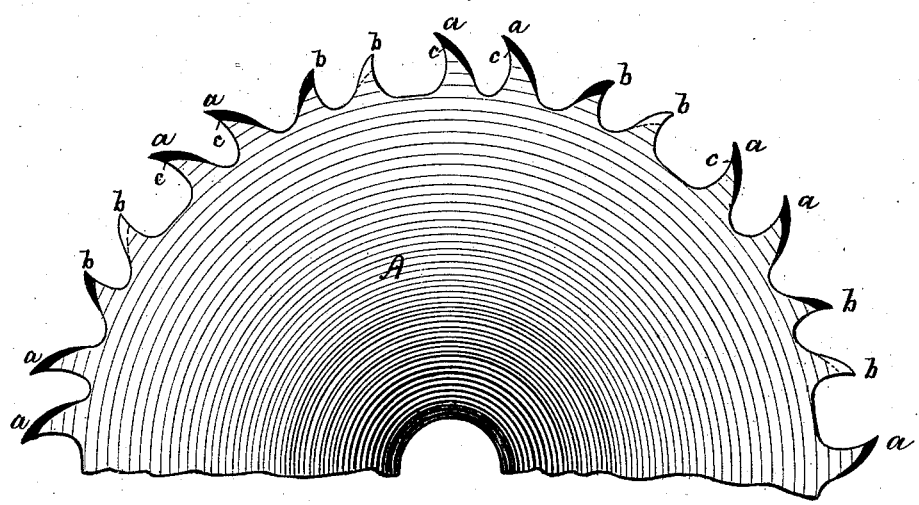
Figure 3:
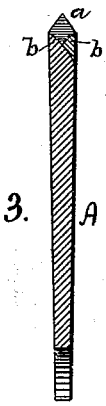
Figure 2:

The drawings accompanying this specification represent, in Figure 1, a face view, in Fig. 2 an edge view, and in Fig. 3 a section, of a saw embodying my improvements.

In these, A represents a circular saw adapted to cutting various kinds of wood, the teeth of this saw being assembled, preferably, in pairs, $a\ a$, $b\ b$, &c., in regular alternating succession, though I do not restrict myself to such an arrangement, as they may be interspersed singly or grouped in number of more than two.

The purpose of this saw is to plane the stock at the time of sawing and by the same means; and the teeth $a\ a$, which I have termed the "saw-teeth," since they act in advance of the others and cut the saw-kerf, virtually perform the planing—that is, they execute the greater part of it, leaving the teeth $b\ b$ to remove any slight imperfections or projections left by the first.

The two sets of teeth are hook-shaped, and slope in opposite directions. The teeth $b\ b$ are shorter than the teeth $a\ a$ to the extent of the V-shaped portion of the latter—that is to say, the periphery of the teeth $b\ b$ extend only to a circle drawn from the center of the saw with a radius equal to the distance between that point and the outermost point, $c$, of intersection of the chamfered and straight portions of the teeth $a\ a$.

The saw is gradually reduced in thickness from its circumference to its axis, or approximating its axis, and as the teeth are sloping, it follows that the outer portion or corner of each tooth is always the thickest, and this is important in view of what follows.

The finishing-teeth $b\ b$, as before stated, slope in a direction opposite to that of the saw-teeth $a\ a$, and revolve with the convex sides opposed to the wood, in order to execute a drawing or shearing cut and produce as little friction as possible; and these teeth are beveled upon sides opposite each other—that is to say, one is beveled upon one side and the next succeeding one upon the opposite side—in order that they may take equal effect upon both sides of the saw.

The teeth $a\ a$, as will be seen by referring to the drawings, are V-shaped upon their outer edges. Though this construction of the tooth may at first sight appear trifling, yet the results following it are marked and important. The kerf is cut by these teeth $a\ a$, and the bottom of the kerf corresponds to the shape of the tooth—that is to say, is V-shaped also.

The following advantages result from the tooth having the V-shaped edge: First, the teeth enter the wood gradually, and the friction is thereby greatly lessened, for which reason the saw does not become heated, the wood is not discolored, and may be pushed forward and the sawing executed much more rapidly than with a tooth having a flat periphery and square corners; second, the corners or edges of the V-shaped teeth, being obtuse-angled, do not become dull or "turned" as rapidly as with square-cornered teeth; consequently the saw can be run longer without filing than by the present plan; third, the V-shaped teeth effect an obtuse-angled cut upon the wood, which, to a certain extent, is a shear-cut also, the result being that the surface of the wood, as reduced by these teeth, is not torn, but is left much smoother than with the shaped corner of the square tooth.

The teeth $a\ a$ act in advance of the teeth $b\ b$ to cut the saw-kerf, the action of these teeth being such that the surface of the wood is left in a smooth and true condition, the teeth $b\ b$ following after to remove any slight roughness of the surface left by the first.

I claim—

1. A saw-tooth having a chamfered or ∧-formed and convex outer edge, substantially as shown and described.

2. The combination of the two series of teeth $a\ a\ b\ b$ under the construction and arrangement herein shown and described—that is, with the periphery of the former V-shaped and longer than the latter, and sloping in opposite directions, and with the longest points of the teeth $b\ b$ extending to a concentric circle drawn through the base of the V, substantially as shown.

THOMAS TRIPP.

Witnesses:
F. CURTIS,
H. E. LODGE.